United States Patent [19]

Shulman et al.

[11] 4,114,450

[45] Sep. 19, 1978

[54] ELECTRONIC RECORDING ACCELEROMETER

[75] Inventors: Lawrence M. Shulman, East Patchoque; Norman Weingart, Syosset, both of N.Y.

[73] Assignee: Systems Consultants, Inc., Washington, D.C.

[21] Appl. No.: 846,975

[22] Filed: Oct. 31, 1977

[51] Int. Cl.² .................. G01D 1/14; G01D 21/02; G01P 15/00

[52] U.S. Cl. ........................ 73/489; 73/509; 73/517 R; 235/92 AE; 364/551; 364/566

[58] Field of Search ............ 73/516, 517 R, 489, 73/509, 12; 364/551, 566; 235/92 MT, 92 AE

[56] References Cited

U.S. PATENT DOCUMENTS

| | | | |
|---|---|---|---|
| 3,761,917 | 9/1973 | Brown et al. | 235/92 AE X |
| 3,769,844 | 11/1973 | Skoures | 73/517 R |
| 4,023,396 | 5/1977 | Yakshin et al. | 73/12 |

FOREIGN PATENT DOCUMENTS

| | | | |
|---|---|---|---|
| 54,958 | 2/1911 | Switzerland | 73/489 |
| 1,202,164 | 8/1970 | United Kingdom | 73/492 |

*Primary Examiner*—James J. Gill
*Attorney, Agent, or Firm*—Brady, O'Boyle & Gates

[57] ABSTRACT

A self-contained and internally powered shock, temperature and relative humidity acquisition and recording device particularly adapted for the rapid, accurate and automatic analysis of material handling and transportation facilities and procedures. The apparatus includes transducers which are used to sense shock, temperature and humidity in analog form. The analog signals generated by the transducers are converted to digital signals, i.e., binary multi-bit words which by means of digital logic and solid state memory devices, statistical and time dependent information are stored for an operating interval as long as two weeks. Thereafter the device is coupled to an interrogation system which generates output records from the collected data in operator selected density profiles or time histories.

15 Claims, 9 Drawing Figures

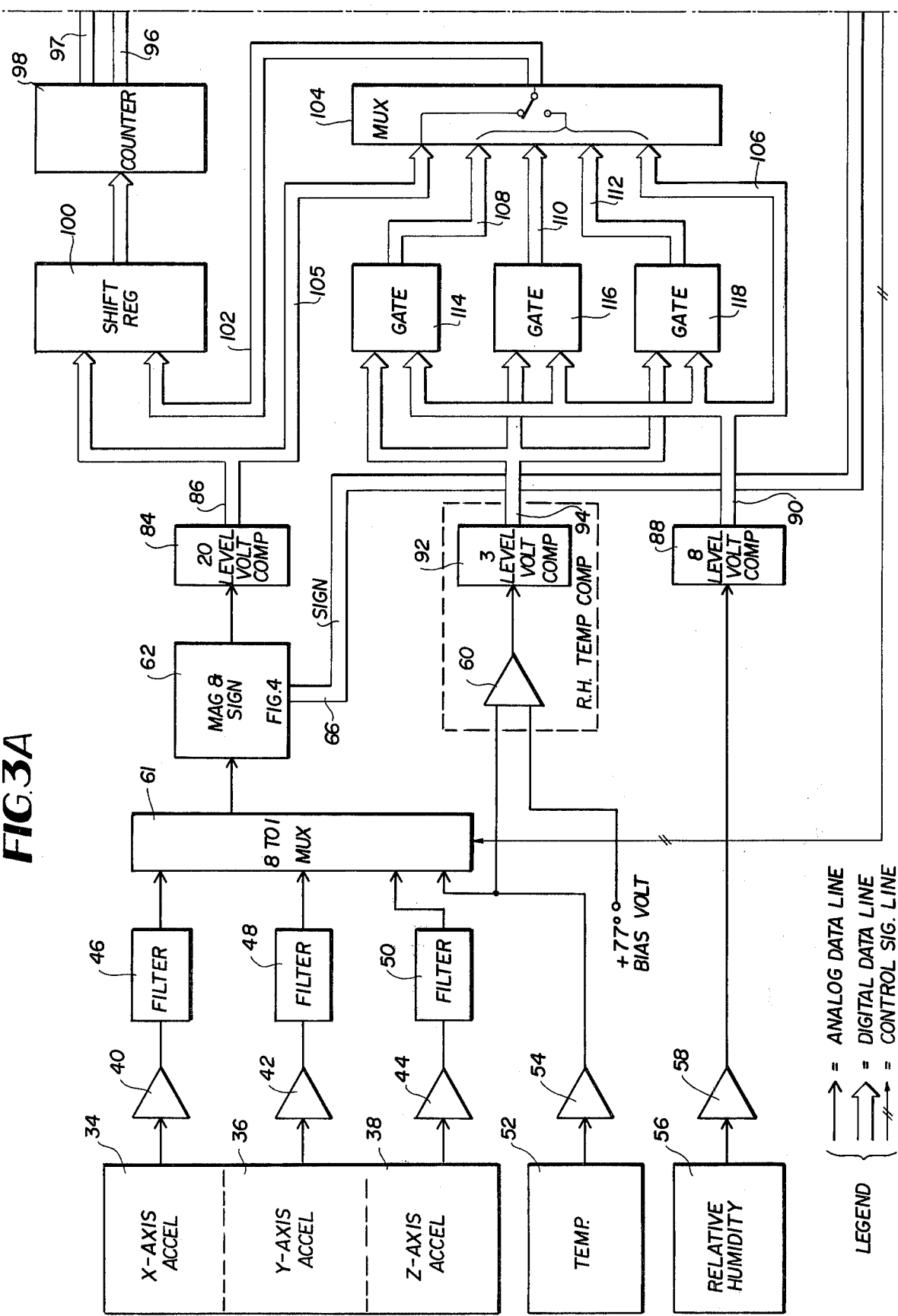

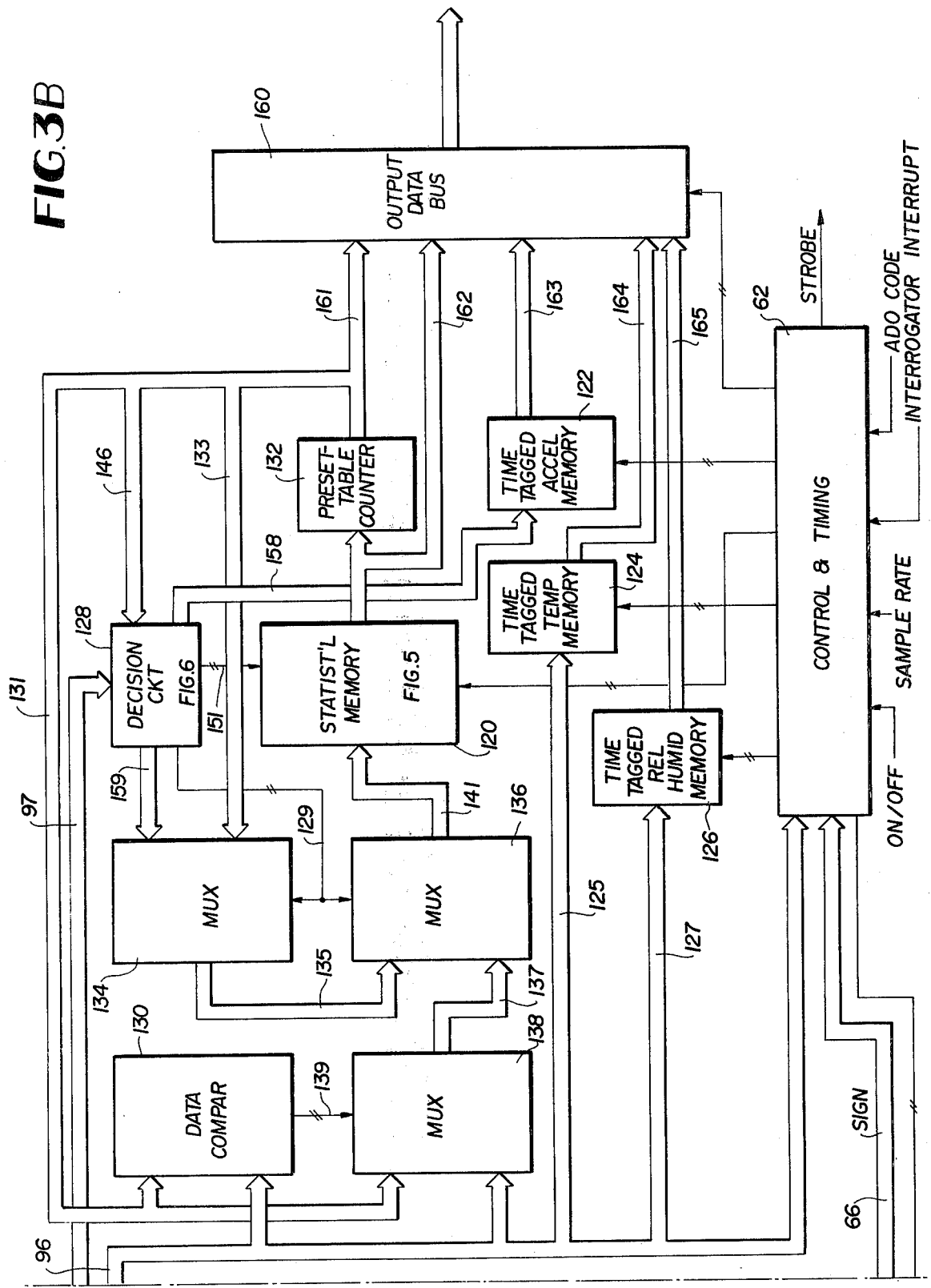

FIG. 4
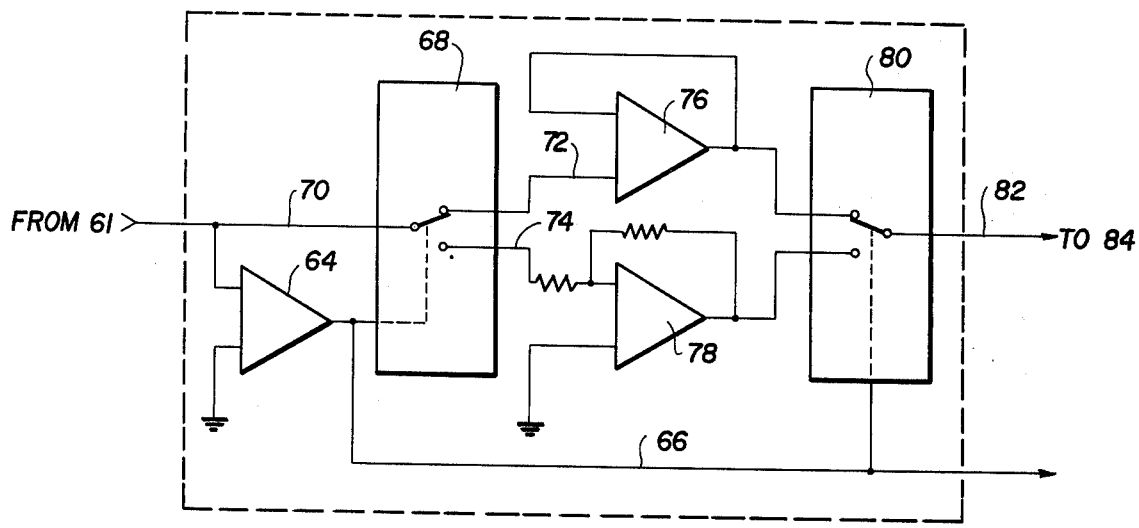
FIG. 5
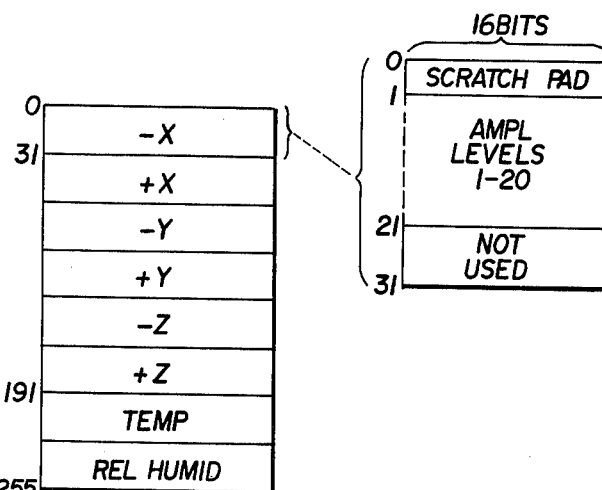
FIG. 7
FIG. 8
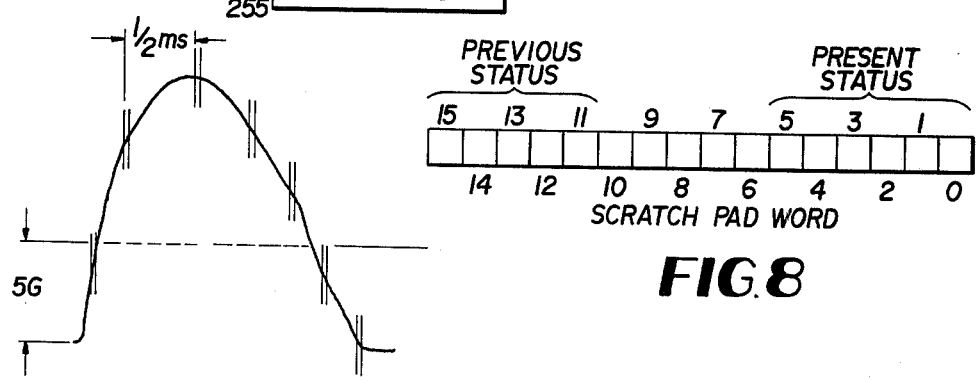

ELECTRONIC RECORDING ACCELEROMETER

BACKGROUND OF THE INVENTION

This invention relates generally to environmental recording apparatus and more particularly, to apparatus which is adapted to simulate a parcel which is sent through a parcel handling system such as the U.S. Postal Service, and records shock, temperature, and relative humidity for a period of up to two weeks with the data being stored in semi-conductor memories in two formats, one being a statistical compilation of all valid events that occurred and the other being a time history of valid events that occurred. The exact magnitude of the event is not stored, but rather the event is classified into a number of predetermined amplitude levels or windows. For shock data, these windows are 5 G's wide from the base level of 5 G's to 80 G's and 10 G's wide from 80 G's to 120 G's. The temperature windows are 10° F wide from −20° F to +140° F, and for relative humidity, the windows are 10% wide from 20% to 100%.

Accordingly, the present invention has particular utility in solving the problems of parcel handling from the point of shipment to its destination with the recordal of pertinent data of the handling characteristics given the simulated parcel along the way so that a determination can thereafter be made as to any abuse, mishandling or accident occurring during the course of shipment.

The following listing comprises prior art references of which the applicant is currently aware, this listing being made in order to fulfill the duties of those who are substantially involved in the preparation and prosecution of the subject application to disclose to the Patent and Trademark Office information which is material to the examination of the subject application: U.S. Pat. Nos. 3,020,874 — Bruce, et al., 3,739,202 — Cady, 3,284,708 — Morris, et al., 3,769,844 — Skoures, 3,389,607 — Kishel, 3,909,568 — Greenhug, 3,515,091 — Smith, 4,016,766 — Morris, 3,599,222 — Franklin, 4,004,450 — Yakschin, et al., 3,761,917 — Brown, et al. 4,023,396 — Yakschin, et al., 3,643,513 — Weaver, 4,030,339 — Yakschin, et al.

SUMMARY

Briefly, the subject invention is directed to a system for providing both statistical and time dependent information of the environment subjected to a simulated parcel containing means for sensing acceleration along three mutually perpendicular axes, temperature and relative humidity. These signals in analog format are respectively fed to voltage level comparator circuits. The output of the comparators are fed to encoding means which are adapted to provide binary multi-bit data words of the levels sensed. These binary digital data words are applied to a statistical memory as well as respective time tagged memories for acceleration, temperature and relative humidity, whose outputs are adapted to be later connected to an output data bus which organizes the data from the four memories into a format suitable for retrieval by an interrogation system. The statistical memory is adapted to provide a count of the various levels of acceleration, temperature and relative humidity sensed while the time tagged memories are adapted to provide stored time dependent data of the maximum values sensed during selectable time periods within the time allotted to send the apparatus from one destination to another, which time may be in the order of 2 weeks. The sensors are adapted to operate within the constraints of an environment which includes shocks as great as 150 G's and temperatures ranging from −20° F to +140° F and for relative humidities of the range of 20% to 100% relative humidity.

BRIEF DESCRIPTION OF THE DRAWINGS

FIGS. 3A and 3B is an electrical block diagram illustrative of the preferred embodiment of the subject invention;

FIG. 4 is an electrical block diagram illustrative of a signal conditioning and sign determining circuitry shown in FIG. 3A;

FIG. 5 is a diagram illustrative of the statistical memory configuration;

FIG. 7 is a graphical illustration helpful in understanding the operation of the subject invention; and FIG. 8 is a diagram illustrative of the scratch pad word configuration further helpful in understanding the operation of the subject invention.

DESCRIPTION OF THE PREFERRED EMBODIMENT

Figure 1:
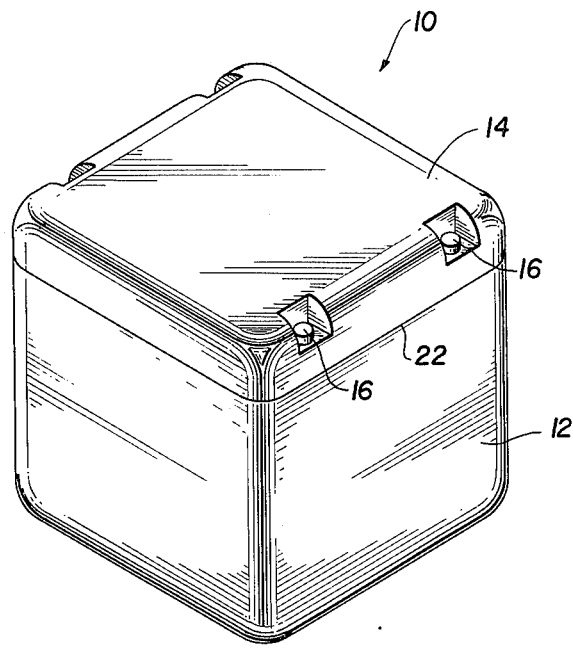
FIG. 1 is a perspective view of the subject invention when ready for being shipped as a parcel.
Figure 2:
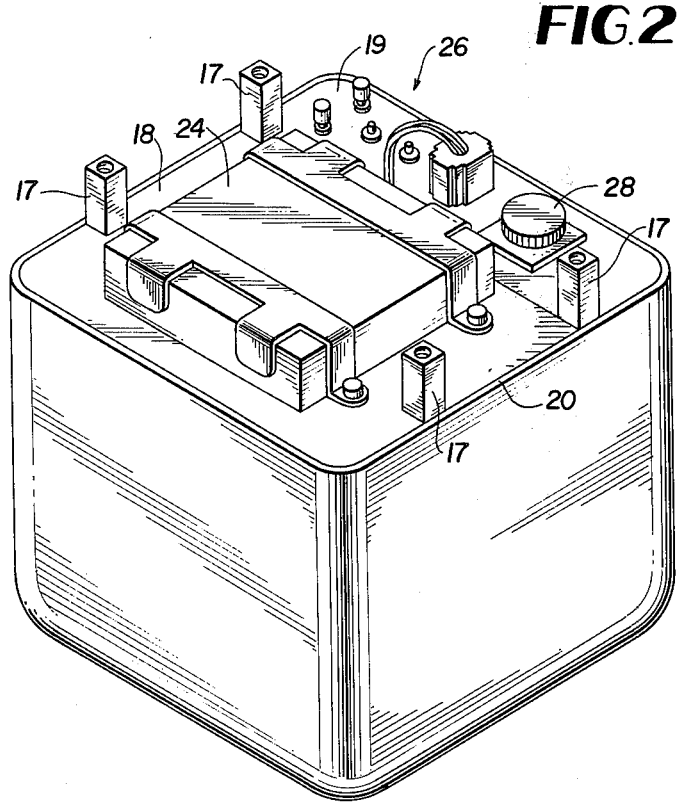
FIG. 2 is a perspective view of the casing shown in FIG. 1 with its cover removed.

Referring now to the drawings, and more particularly to FIGS. 1 and 2, reference numeral 10 denotes a ruggedized box-like case or housing consisting of a body section 12 and a cover section 14. The cover 14 is adapted to fit snugly over the body portion 12 and to be secured thereto by a plurality of screws 16 which are adapted to engage threaded holes in the posts 17. The body portion 12 includes panel members 18 and 19 which are substantially flush with the rim 20 and which is adapted to receive the rim 22 of the cover 14.

A power cell 24 in the form of a long life battery (2 weeks continuous operation) is secured to the panel 18 and provides the necessary power for operating certain environmental sensor circuits e.g. a temperature sensor bridge circuit and relative humidity sensor bridge circuit, not shown, as well as other electronic circuitry located within the interior of the body portion 12. Adjacent the power cell 24 is an assembly of switches generally designated by reference number 26 located on panel member 19 for turning on power and manually selecting one of the plurality of time tagged periods, e.g. 3, 30, and 300 seconds, as well as providing means for setting a starting time. Additionally, an electrical connector 28 is provided for coupling the electronic circuitry contained within the housing 12 to interrogator apparatus, not shown, but which is adapted to provide a print out of the data stored in memory as hereinafter to be described. The electronic circuitry to be described is made up of standard integrated circuit modules mounted on a plurality of circuit cards, not shown. With the cover 14 in place as shown in FIG. 1 and the power turned on and an operator selected testing period initiated, the entire unit is adapted to sense and digitally store acceleration data along three mutually perpendicular axes as well as data for temperature and humidity for a period up to two weeks.

Referring now to FIG. 3A, bidirectional acceleration along three mutually perpendicular axes are provided by three accelerometers 34, 36 and 38 consisting of, for example, type 20D21 piezoelectric devices manufactured by Unholtz-Dickie. Piezoelectric transducers are utilized because they are particularly adaptable to be coupled to high input impedance operational amplifiers. Accordingly, the three accelerometers 34, 36 and 38 are coupled to respective 506S operational amplifiers 40, 42 and 44 manufactured by Analog Devices, for example, which are configured in a charge amplifier configuration and which are adapted to raise the signal level up to a level sufficient for being fed to Bessel low-pass filter circuits 46, 48 and 50 comprised of National Semiconductor type LM4250 operational amplifiers configured as active filter circuits. The filters 46, 48 and 50 act to remove high frequency components of any shock wave sensed, since in considering damage criteria to the package 10, low frequency high energy components of the shock wave are a primary concern and the smoothing effect of the filter on the waveform leads to relatively consistent results with the sampling technique, to be described, being utilized by the subject invention.

Prior to discussing the signal flow of the analog outputs of the three accelerometers thus amplified and filtered, the sensors for temperature and relative humidity are next considered. In order to conserve power, a temperature sensor 52 consisting of a precision wound platinum wire resistance temperature sensor manufactured, for example, by the Phys-Chemical Research Corporation under part number P/Ng31 is utilized. Such a device additionally exhibits a relative linear resistance vs. temperature response over the temperature range of $-20°$ F to $+140°$ F, the particular region of concern in this invention. The temperature sensor 52 is connected into a resistance bridge circuit configuration, not shown, but which is a circuit well known to those skilled in the art. The output of the bridge circuit is connected to an instrumentation amplifier 54 typically of the type manufactured by National Semiconductor and identified as a LH0036G micropower operational amplifier. This amplifier has a gain which is particularly adapted to interface with the signal levels at the output of the filters 46, 48 and 50 as will be shown.

Relative humidity is sensed by means of an ionic exchange variable surface conductivity sensor 56 of the type manufactured by the Phys-Chemical Research Corporation, under type PCRC-11. This device is also included in a standard bridge configuration, not shown; however, the output of this device is highly non-linear, exhibiting a semi-logarithmic negative proportionality of resistance with respect to relative humidity, as well as a negative coefficient of temperature. As in the case of the temperature sensor, the relative humidity sensor 56 is also coupled to an instrumentation amplifier 58 also being typically a National Semiconductor LH0036G instrumentation amplifier. Since it is desired to provide accurate relative humidity indications over the range of 20% to 100%, the effects of temperature on the sensor 56 must be compensated for and is easily done by adding or subtracting an increment of relative humidity based upon a predetermined temperature reference, which in this case is $+77°$ F. Accordingly, temperature compensation for relative humidity is provided by a programmable operational amplifier 60, typically a National Semiconductor LEM4250 semiconductor device operating as a differential amplifier having one input connected to the output of instrumentation amplifier 54 while the other input is connected to a bias signal voltage corresponding to $+77°$ F.

The purpose of the circuitry discussed thus far is for converting the outputs of the sensors 34, 36, 38, 52 and 56 to a format which is easily handled by digital electronics. Accordingly, the exact magnitude of the shock, temperature and relative humidity is not determined but rather the event is classified into one of a predetermined number of amplitude windows i.e., within a predetermined range of values. For shock data, these windows are 5 G's wide from 5 G's to 80 G's and 10 G's wide from 80 G's to 120 G's upward. For temperatures, the windows are $10°$ F wide from $-20°$ F to $+140°$ F. While for relative humidity, the windows are 10% RH wide from 20% to 100%.

In order to determine the amplitude level for each axis of acceleration and temperature, the low pass filters 46, 48 and 50 as well as the instrumentation amplifier 54 are fed to an 8:1 analog multiplexer or simply MUX 61 which operates in accordance with a timing signal coupled thereto from a control and timing circuit 62 shown in FIG. 3B to sequentially couple the three accelerometer analog input signals to its output at a sampling rate such that each channel is updated every 0.5 milliseconds, while the temperature input is coupled to the output in five minute intervals. The multiplexer 61 typically comprises a CD4051 semiconductor circuit element manufactured by RCA. The output of the multiplexer 61 feeds into a circuit 62 shown in greater detail in FIG. 4 for providing further signal conditioning of the analog signals applied thereto as well as providing a means for determining its sign. The latter has particular significance as it relates to the bi-directionality of the accelerometer outputs, being either $+$ or $-$ with regard to a predetermined origin and since $+$ or $-$ direction parameters will be stored in separate memory locations.

Referring now briefly to FIG. 4, the circuit 62 includes a differential amplifier 64 having one input grounded while the other input is connected to the output of the multiplexer 61. The output of the amplifier 64 couples to a binary signal data line 66 as well as the control input to a signal switch 68 which may be, for example, a multiplexer and which is adapted to switch circuit lead 70 between two output lines 72 and 74. The polarity signal appearing on signal line 66 is fed back to the control and timing circuit 62 (FIG. 3B) for controlling selection of specific digital memory blocks in a manner to be described hereinafter. The output signal lines 72 and 74 from the switch 68 respectively feed into a pair of unity gain amplifiers 76 and 78 whose outputs are connected to a second signal switch circuit 80 which is also controlled by the output of the comparator 64 to cause the analog signal switched between the outputs of the amplifiers 76 and 78 to appear on circuit lead 82.

Circuit lead 82 is coupled to an analog voltage level comparator circuit 84 which includes a set of 20 voltage comparators, not shown, and which are operable to detect 20 discrete amplitudes of analog voltage and thus establish 20 predetermined amplitude windows for acceleration sensed. The first 16 voltage comparators also serve to determine which of the 16 amplitude windows the analog temperature data falls within. The comparator circuit 84, for example, consists of five National Semiconductor LM139 quad comparators, which are adapted to provide a 20 bit digital output signal for the highest window reached, this signal appearing on a 20 bit data bus 86 shown in FIG. 3A. While the comparator circuit 84 is adapted to provide a digital output corresponding to the amplitude levels not only of the three accelerometers 34, 36 and 38 as well as the temperature sensor 52, a digital representation of the relative humidity is provided by a second comparator circuit 88 which is also configured from National Semiconductor MLM139 quad comparators to provide detection for 8 amplitude levels or windows on an 8 bit output data bus 90. Inasmuch as a compensation must be made of relative humidity due to the temperature characteristic of sensor 56, a third comparator circuit 92 also consisting of a set of National Semiconductor LM139 quad comparators are adapted to provide a 3 bit digital output on a data bus 94.

Up to the comparator circuits 84, 88 and 92, the signals dealt with are analog signals, having amplitudes corresponding to the respective measured parameters. The comparators, however, output digitized window signals corresponding to the window levels reached by the respective comparators. The present invention accordingly is adapted to now store this digitized data for subsequent retrieval in four digital memories, one being a statistical memory for counting the number of the levels sensed at each level for acceleration temperature and relative humidity, while the remaining three memories comprise separate time related memories for storing the value of level sensed for acceleration, temperature and relative humidity respectively. The digital data to be stored is sequentially loaded into time related memories in multi-bit code words which appear on the output data bus 96 of a digital counter 98 coupled to a shift register 100. The shift register is adapted to be coupled to 12 bits of the 20 bit data bus 86 and an 8 bit data bus 102 from a digital multiplexer 104. The inputs to the multiplexer 104 comprises the other 8 bits of data bus 86 on bus 105 as well as 5 bits of the 8 bit relative humidity data bus 90 applied via bus 106 together with one bit data lines 108, 110, and 112 from logic gates 114, 116 and 118, each having a respective input of one of the bits of the three bit data bus 94 of the relative humidity compensation comparator circuit 92. The other input to the logic gates 114, 116 and 118 comprises a respective one digit line from the remaining 3 digits of the 8 bit data bus 90 from the comparator circuit 88. The multiplexer 104 typically is comprised of two RCA CD4019 four channel multiplexer-demultiplexer circuits while the shift register 100 is comprised of three RCA CD4014 8 bit shift registers with the last 4 bits being unused.

The control and timing circuit 62 shown in FIG. 3B is adapted to synchronously operate the multiplexers 61 and 104 so that the encoding shift register 100 (FIG. 3A) receives binary data of the three accelerometers 34, 36 and 38 every 0.5 millisecond while temperature and relative humidity data are received once every 5 minutes. The counter 98 accordingly outputs this quantized window data as a 5 bit code word on data bus 96. A statistical memory 120, a time tagged acceleration memory 122, a time tagged temperature memory 124, and a time tagged relative humidity memory 126 are adapted to selectively store these code words in the following manner.

Considering first the statistical memory 120, it consists of a 256 word by 16 bit memory organized as shown in FIG. 5. The first 192 words are used to store 6 sets of shock data with 32 words being allocated to each accelerometer axis parameter, namely −X, +X, −Y ... +Z. The next 32 words are adapted to store temperature data, the final 32 words are adapted to store relative humidity data. Each block of 32 words uses the first word as a working scratch pad, while the following 20 words have addresses corresponding to the 20 amplitude windows for acceleration level. The word group for temperature utilizes only the next 16 words following the scratch pad work for temperature windows and the word group for relative humidity uses only the next 8 words following the scratch pad word. The statistical memory 120 is configured, for example, by using four Intel 5101, 256 × 4 random access memories (RAMs). The statistical memory 120 is adapted to address the highest amplitude window for any "valid" shock event whereupon the count of the addressed memory location increased by one each time such an amplitude is sensed while the temperature and relative humidity counts for the appropriate memory locations have their respective contents increased by one count each 5 minutes.

Each of the scratch pad words of the memory plays an important part in the storage of data as will become evident. The statistical memory 120 operates in conjunction with a decision logic circuit 128 as shown in detail in FIG. 6, for implementing the criteria for a valid shock event and determining when such an event is terminated. Also used in combination with the statistical memory 120, is a binary CD 4063 data comparator 130, a presettable counter 132 and three digital data switches consisting of multiplexers 134, 136 and 138.

A valid shock in a particular direction along any accelerometer axis is defined as when three of the previous five samples for that axis and direction outputted from the multiplexer 61 (FIG. 3A) are above the 5 G level without two consecutive samples being below 5 G's and the present sample is above 5 G's. A graphical representation of this is shown in FIG. 7. The presettable counter 132 is adapted to take any previous 5 bit code word stored in the last bits (11–15) of the scratch pad memory word as shown in FIG. 8 and apply it back to the data comparator 130 via data bus 131 which also receives the 5 bit code word for the present sample on bus 96. The data comparator 130 acts to operate the multiplexer 138 via control line 139 to present the larger of the two code word inputs to the multiplexer 136 on bus 137. The multiplexers 134 and 136 operate in response to a control signal from decision logic circuit 128 on control circuit line 129 to continuously update the respective scratch pad word via bus 141 for the highest value of 5 bit code appearing on the data bus 96 in accordance with the criteria established for a valid event, at which time the appropriate amplitude word has its count incremented by one count. Accordingly, the scratch pad word provides a feedback and a comparison reference for subsequent data samples.

Figure 6:
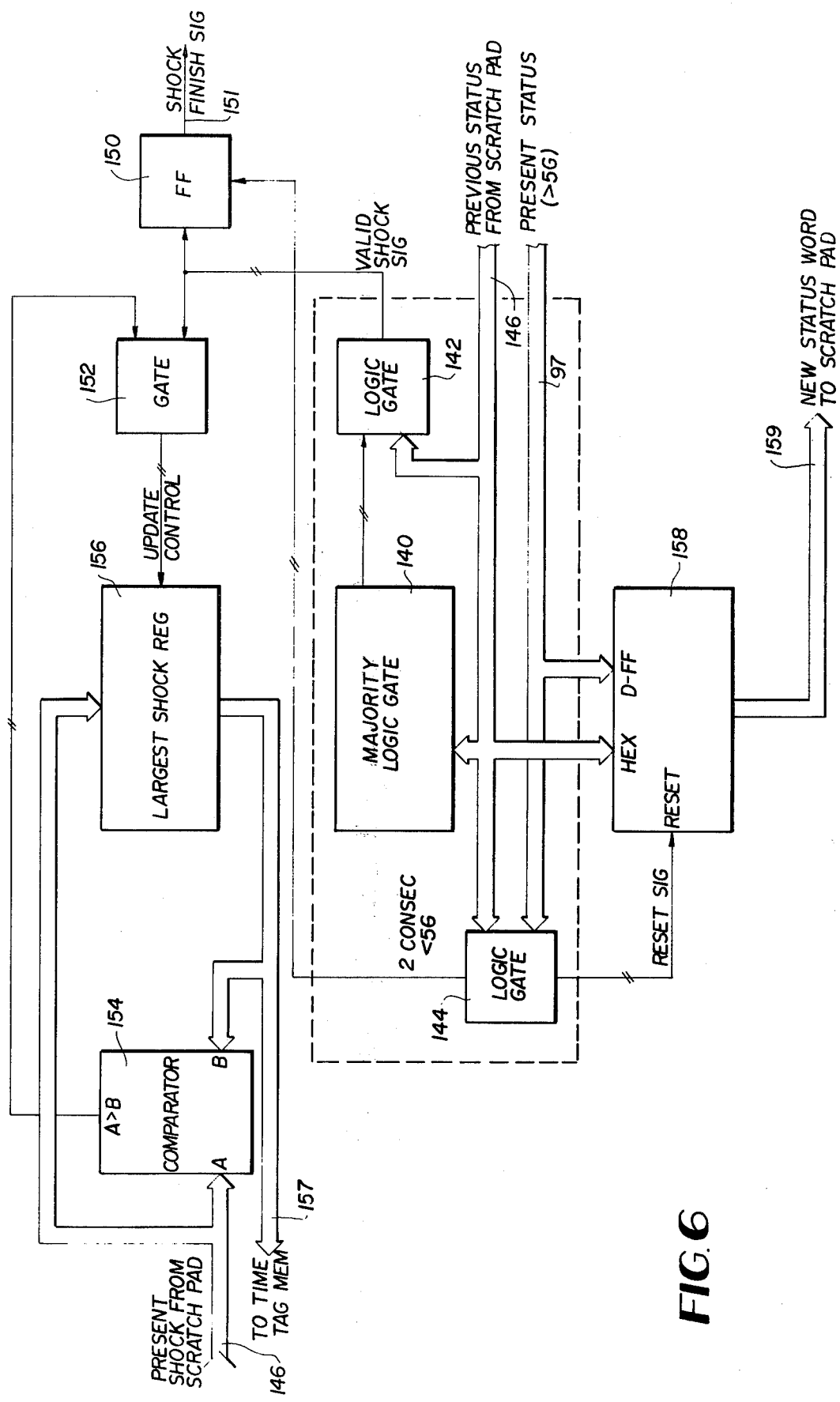
FIG. 6 is an electrical block diagram illustrative of the decision logic circuit for implementing a criteria for a valid shock event.

The decision logic circuit 128 implements the criteria for a valid event by the circuit means shown in FIG. 6. There a majority logic gate 140 in combination with logic gates 142 and 144 are adapted to be responsive to the previous and present status of the scratch pad word appearing on data bus 146 coupled to presettable counter as well as a one bit status word from the encoding counter 98 via data bus 97, indicative of the present data sample being greater than 5 G's, to indicate a valid shock and the occurrence of two consecutive samples below 5 G's which is indicative of the end of a shock event, respectively. Upon occurrence of a valid shock, the gate 142 sets a flip-flop 150 as well as applies an input to gate 152. The amplitude of the present shock, for example, from the appropriate scratch pad word of memory 120 is applied to one input of a second data comparator 154, typically a 4063 type comparator which is adapted to receive as its other input, the content of a register 156 which is adapted to store the level of the largest sample for the specific shock. If the input of the present sample is greater than the content of the register 156, the comparator 154 couples a signal to the gate 152 which provides an update control and the amplitude window of the present shock is loaded into the register 156. Additionally, upon the occurrence of two consecutive sample levels less than 5 G's, the gate 144 resets a Hex D-flip-flop 158 and a new status word is sent back to the scratch pad on bus 159 and the multiplexers 134 and 136. The amplitude of this present shock is used to address a statistical memory location in memory 120 whereupon its count is outputted from the memory location and a binary one added thereto and a new count word fed back into the memory location from which it came via the counter 132, bus 133 and multiplexers 134 and 136, thereby logging one event within the amplitude window in the appropriate axis sign.

The register 156 in FIG. 6 which is adapted to store the largest sample value greater than a 5 G value for any valid shock event, also has its output data bus 157 coupled to the time tagged memory 122, which then stores in binary format the level window value of the largest shock sample occurring in operator selected sequential "time tagged" periods which may be, for example, 3, 30, or 300 seconds as controlled by the control and timing circuit 62 in response to a sample rate control applied thereto from the front panel controls shown in FIG. 2.

The time tagged acceleration memory 110 is adapted to store 4096 six bit words. However, a time saving feature is provided in the present invention by adding another bit to the digital code word outputted from the register 156 shown in FIG. 6 and which is coupled to the time tagged memory 122. This is achieved by noting the binary value of the most significant bit of this six bit code word. If this bit equals a binary "0", the remaining 5 bits represent the highest amplitude window achieved during the respective time period and which was stored in the register 156. If the most significant or sixth bit equals a binary "1", however, the remaining 5 bits are made to represent the number of sequential time periods in which shocks at magnitudes less than 5 G's occurred. Accordingly, in a quiescent state, i.e., wherein no shock values in excess of 5 G's exist, 32 time periods can be compressed into the binary value of 11111 preceded by a binary "1". On the other hand where no time periods occur having shocks less than 5 G's, the sixth bit would always be a binary "0" and accordingly only 4 K binary values of actual shock could be recorded. Table I provides an illustrative example of the time saver capability. Thus memory location No. 4, for example, indicates that 8 i.e., binary "01000" periods elapsed between a shock of a logic level 2 (binary 00010) and a logic level 8 (binary 01000) occurred. Following this, the memory locations 6 through 11 record the total number of quiet periods in binary form for 32 time periods.

While the time tagged acceleration memory 122 incorporates the time saver capability by the coding imparted to the last or most significant bit, the time tagged memories 124 and 126 for temperature and relative humidity do not incorporate such a capability, however, the control and timing circuit 62 sequences i.e., indexes memory locations at 20 minute intervals and accordingly loads into memory every fourth value of temperature and relative humidity levels outputted at 5 minute intervals from the multiplexer 61 and encoder counter 98. The temperature data since it only uses 16 levels of the comparator 84, is adapted to be encoded as a 4 bit binary number into each memory location of the memory 124 via data bus 125, whereas the eight relative humidity windows can be encoded in the same manner as a 3 bit word into the time tagged memory 126 by means of data bus 127. Whereas the statistical memory provides a binary count of the number of shock events occurring at each of the 20 amplitude windows, the time tagged windows provide a measure in binary form of the window level reached for that specific time interval.

TABLE I

| Time Period | Shock Window | Amplitude Window Level |
|---|---|---|
| 1 | 5–10 | 1 |
| 2 | 15–20 | 3 |
| 3 | 10–15 | 2 |
| *4–11 | quiet | — |
| 12 | 40–45 | 8 |
| *13–200 | quiet | — |

The stored data would be:

| Memory Location | 5 | 4 | 3 | 2 | 1 | Bits 0 |
|---|---|---|---|---|---|---|
| 1 | 0 | 0 | 0 | 0 | 0 | 1 |
| 2 | 0 | 0 | 0 | 0 | 1 | 1 |
| 3 | 0 | 0 | 0 | 0 | 1 | 0 |
| *4 | 1 | 0 | 1 | 0 | 0 | 0 |
| 5 | 0 | 0 | 1 | 0 | 0 | 0 |
| *6 | 1 | 1 | 1 | 1 | 1 | 1 |
| *7 | 1 | 1 | 1 | 1 | 1 | 1 |
| *8 | 1 | 1 | 1 | 1 | 1 | 1 |
| *9 | 1 | 1 | 1 | 1 | 1 | 1 |
| *10 | 1 | 1 | 1 | 1 | 1 | 1 |
| *11 | 1 | 1 | 1 | 1 | 0 | 0 |

*time saver mode

A single output data bus 160 is coupled to the four memories 120, 122, 124 and 126 by the multi-bit digital data buses 161–165. The output data bus 160 is adapted to be coupled to an interrogation device, not shown, which sends out an "ADD CODE" data word which is interpreted by the timing control logic circuit 62 for causing the data to be selectively outputted from the memories where it is interpreted by a data formatter in the interrogation device where it is then adapted to be processed to generate statistical count summary tables and histogram plots of temperature, relative humidity and shock data.

What has been shown and described, therefore, is a simulated parcel comprising an integrated self-contained and internally powered data acquisition and recording device including transducers to sense shock, temperature and humidity with analog signal conditioning circuits and digital logic and solid state memory devices being incorporated therein for operating over an interval as long as 2 weeks with the digital data collected consisting of both statistical and time dependent information which is stored in a manner suitable for subsequent retrieval and analysis by a programmable interrogation device.

While there has been shown and described with what is at the present considered to be the preferred embodiment of the subject invention, further modifications thereto will readily occur to those skilled in the art. It is not desired, therefore, that the invention be limited to the specific arrangements of elements shown and described, but it is to be understood that all equivalents, alterations and modifications coming within the spirit and scope of the present invention as set forth in the following claims are herein meant to be included.

We claim as our invention:

1. Apparatus for sensing and recording, for subsequent retrieval, environmental data such as shock, temperature and relative humidity, comprising, in combination:
    a substantially ruggedized case for housing said apparatus in the form of a simulated parcel and including a power source therein for operating said apparatus over a predetermined period of time such as the time required for shipping said case from one destination to another;
    a plurality of environmental data sensors located in said case and being operable to be responsive at least to shocks encountered bidirectionally along three mutually perpendicular axes and providing respective analog output signals having amplitudes which are a measure of the magnitude of the respective shocks encountered;
    analog signal multiplexer circuit means coupled to said plurality of data sensors and being operable to provide a repetitive multiplexed sequence of data signal samples of said analog output signals;
    electrical circuit means coupled to said signal samples and being responsive thereto to classify each of said data signal samples by means of voltage comparator circuit means into amplitude windows of predetermined increments and including encoding means for generating a multi-bit digital code word corresponding to the largest amplitude window reached by each data signal sample;
    a statistical digital memory coupled to said electrical circuit means and having a respective addressable memory location for each digital code word and being operable to statistically count and store in binary format at each memory location the number of respective digital code words generated over a predetermined sampling period;
    a time tagged digital memory coupled to said electrical circuit means and having time dependent addressible memory locations for a predetermined number of sampling periods and being operable in one mode to selectively store in binary format the largest value of a code word occurring within at least one sampling period and in another mode to store in binary format the number of time periods wherein code words of less than a minimum amplitude window are generated; and
    means coupled to said digital memory for selectively reading out on demand the binary formats of said memory locations for generating statistical and time histories of the data stored therein.

2. The apparatus as defined by claim 1 wherein said plurality of environmental data sensors includes at least one sensor responsive to environmental data other than shock data, and additionally including another time tagged digital memory coupled to said electrical circuit means and being operable to selectively store periodically in binary format digital code words for the window reached within the sampling selected for said sensor responsive to data other than shock data.

3. The apparatus as defined by claim 2 wherein said sensor responsive to data other than shock data comprises a sensor responsive to temperature.

4. The apparatus as defined by claim 3 and additionally including at least another environmental data sensor responsive to still another type of environmental data other than shock data and providing a respective analog output signal having an amplitude which is a measure of the data sensed thereby; and
    another electrical circuit means coupled to said analog output signal from said another environmental sensor and being responsive thereto to classify said analog output signal provided thereby into amplitude windows of predetermined increments by means of respective voltage comparator means and being adapted to be coupled to said statistical memory in multiplexed relationship with said first recited multi-bit digital code words; and
    additionally including still another time tagged digital memory and being operable to selectively store periodically in binary format digital code words for the window reached within the sampling period selected for said at least another sensor.

5. The apparatus as defined by claim 4 wherein said another environmental sensor comprises a sensor responsive to relative humidity.

6. The apparatus as defined by claim 1 and additionally including circuit means coupled between said multiplexer circuit means and said electrical circuit means for conditioning the amplitude of said analog signal for said voltage comparator means and for determining the bidirectional sign of the shock analog output signals along their respective axis and providing a digital signal thereof, said digital signal being adapted to be utilized to address predetermined groups of addressible memory locations of said statistical digital memory whereby two groups of memory locations are provided for each of said three axes, one group for each direction.

7. The apparatus as defined by claim 1 wherein said statistical digital memory additionally includes at least one addressible memory location adapted to operate as a scratch pad memory, and
    additionally including digital logic circuit means coupled between said encoding means and said scratch pad memory for comparing successive digital code words and determining the highest value within said sampling period based upon a pedetermined criteria defining a valid event in response to a plurality of data signal samples of the same type and thereafter addressing the memory location of said highest value and causing the binary value stored therein to be increased by a count of one each time a valid event occurs.

8. The apparatus as defined by claim 7 and additionally including a digital register for temporarily storing the largest digital code word within a valid event occurring within a sampling period, and additionally including circuit means coupling said register to said time tagged memory for logging the value thereof in the memory locaton for said sampling period.

9. The apparatus as defined by claim 7 wherein said digital logic circuit means additionally includes valid event decision circuit means responsive to code words for at least five successive data signal samples of the same type and being operable to determine where three of the five data samples have values exceeding a predetermined minumum value without two consecutive samples being below said minimum value and providing a control signal to said statistical digital memory for causing the event count to be increased.

10. The apparatus as defined by claim 1 and additionally including low pass filter circuit means coupled between said data sensors and said multiplexer circuit means.

11. A method for sensing and recording shock data in a simultated parcel comprising generating an analog signal in response to shock sensed at least along one reference axis, taking repetitive data samples at sub-intervals of a sampling time interval of said analog signal at a predetermined repetition rate, converting the discrete amplitudes of the data samples to amplitude window signals, coverting the amplitude window signals into respective multi-bit binary code words, determining from a predetermined number of successive data samples whether a predetermined minimum shock event exists, applying said binary code words for each data sample successively to a statistical digital memory and successively comparing data samples and storing the largest value sensed over a predetermined sampling time interval, thereafter addressing a memory location having an address corresponding to the largest value sensed and increasing the binary count contained in said memory location of said statistical memory by one count when said predetermined minumum shock event is present, and addressing a memory address location corresponding to said time interval in a time tagged memory in one mode of operation and reading in a binary value thereat of the value sensed during said time interval.

12. The method as defined by claim 11 wherein said sensing step comprises sensing acceleration along three mutually parpendicular axes and additionally sensing temperature, multiplexing said analog signals of acceleration and temperature in a serial format prior to converting into amplitude window samples, and periodically addressing a specific memory location in a separate time tagged memory for temperature having an address equal to the amplitude of the temperature sensed and thereat reading in the value of the multi-bit code word.

13. The method as defined by claim 12 and additionally sensing relative humidity and periodically applying a respective multi-bit binary code to a separate time tagged memory for relative humidity.

14. The method as defined by claim 10 wherein said time tagged memory is operable in another mode of operation which is reading in a binary value at a memory address location of the number intervals in which no predetermined minimum shock events are present.

15. The method as defined by claim 14 wherein said another mode is indicated by the most significant bit of the multi-bit code word, said most significant bit in a first binary state being indicative that the remaining bits provide a measure of the window level sensed while the most significant bit having the opposite binary state being indicative of the number of time intervals where no predetermined minimum shock event occurred.

* * * * *